UNITED STATES PATENT OFFICE.

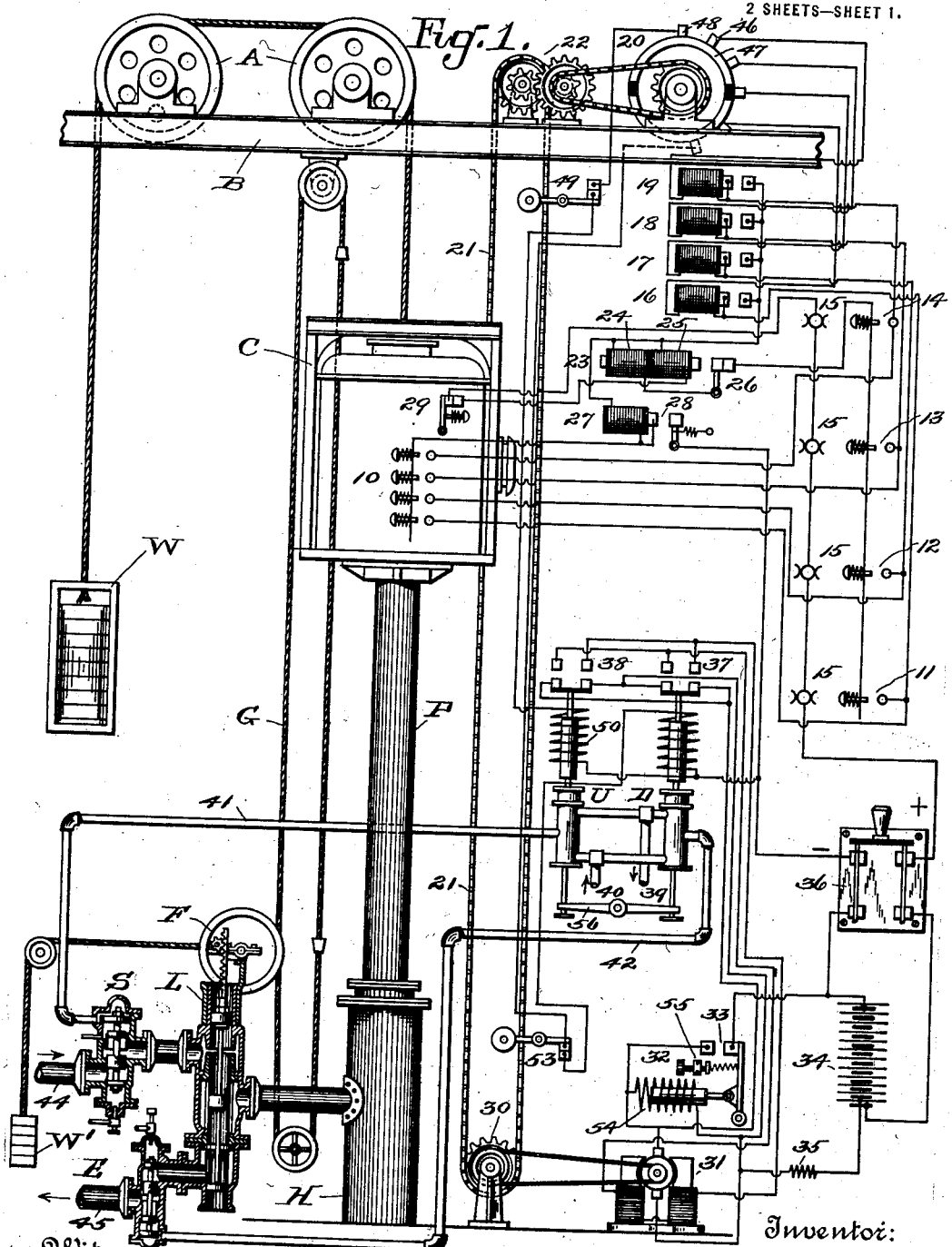

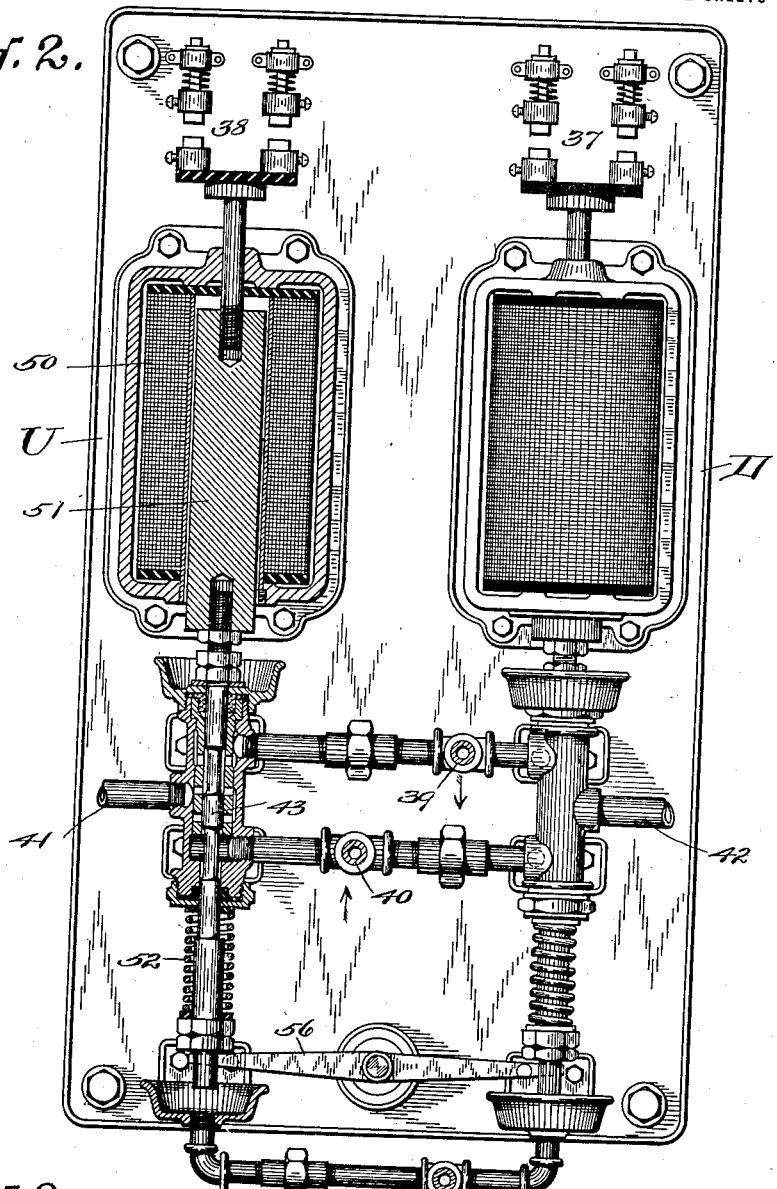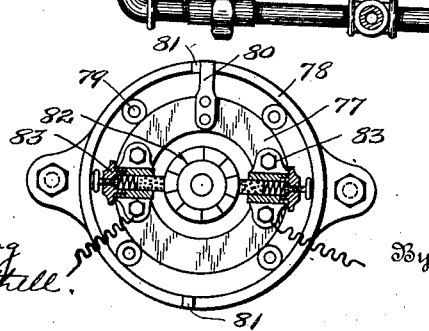

FLOYD C. FURLOW, OF MONTCLAIR, NEW JERSEY, ASSIGNOR TO OTIS ELEVATOR COMPANY, OF JERSEY CITY, NEW JERSEY, A CORPORATION OF NEW JERSEY.

ELECTRICALLY-CONTROLLED ELEVATOR.

1,298,032.  Specification of Letters Patent.  Patented Mar. 25, 1919.

Application filed April 22, 1915. Serial No. 23,012.

*To all whom it may concern:*

Be it known that I, FLOYD C. FURLOW, a citizen of the United States, residing in Montclair, in the county of Westchester and State of New Jersey, have invented a new and useful Improvement in Electrically-Controlled Elevators, of which the following is a specification.

My invention relates to electrically controlled elevators, and has for an object the provision of an efficient and practical method of supplying an unfailing source of electrical energy suitable for use in the controlling circuits.

It is well known that a system of electric control for elevators presents numerous advantages over any other system. Such a system is highly efficient and flexible, and responds instantly to the slightest touch, and, by means of small conducting wires, which may in most cases be concealed from view, is easily led to any desired part of the elevator apparatus there to perform its work. When it is desired to install an electrically controlled hydraulic elevator there is usually available sufficient water power, but it has nearly always been a problem to obtain a suitable source of electric current for effecting the operation of the valves, etc. This is particularly true in the outlying districts, in which there is seldom any electric current of any kind, and when there is any, it is almost invariably of single phase alternating current which for many reasons is not well adapted for elevator controlling purposes. Then again in the case of alternating current electric elevators, the alternating current, while admirably adapted for supplying power to the hoisting motor, is objectionable for many reasons when used throughout the controlling circuits of the system, including the controlling devices, such as electro-magnets, etc., for the reason of the difficulty in designing and constructing suitable electromagnets of sufficient power free from noise and vibration. Furthermore, in both direct and alternating current electric elevators, it is customary to lead the controlling circuit throughout the elevator hatchway and to the car and floor landings as a shunt from the supply line, in which case the electric potential of the controlling circuit is substantially the same as that of the line, and with motors operating on high potential circuits, it is obviously undesirable and dangerous to have the controlling circuit of this high potential.

My invention overcomes all of the above noted and other objectionable features in a simple, practical and efficient manner, and enables one to have on hand an unfailing source of electrical energy in the form of direct current at the potential best adapted to attain the desired results.

Broadly speaking, my invention consists of a storage battery connected in the operating circuit of an electrically controlled elevator system, and a small direct current generator driven by the elevator which supplies energy to the battery and keeps the latter fully charged and in a healthy condition together with automatic means for disconnecting the battery from the generator when the potential of the latter falls below a predetermined value or when the elevator is at rest.

My invention may be readily comprehended from an inspection of the accompanying drawings, in which Figure 1 represents diagrammatically an automatically controlled push button plunger hydraulic elevator embodying my invention; Fig. 2 is a detail view in part section of the reversing valve mechanism; Fig. 3 is a detail view of a modification, illustrating a method for maintaining the polarity of the generator terminals the same regardless of the direction of travel of the elevator.

Like reference characters denote similar parts throughout the various figures.

Referring to Fig. 1, an elevator car C is carried upon the top of a plunger P adapted to reciprocate in a hydraulic cylinder H. A counterbalance weight W is connected by cables to the top of the car C which pass over guide pulleys A carried in bearings upon the overhead beams B. The hydraulic valve mechanism by which the water is admitted to and exhausted from the cylinder H, is substantially like that shown in my Patent 907,985, granted Dec. 29, 1908, for an improvement in push button controlled plunger elevator systems, hence but a brief description will be given at this time. The valve mechanism comprises a pair of electrically operated reversing valves designated by U and D, which are mechanically interlocked by a lever 56 so that both valves cannot operate at the same time, and which are connected by pipes 41 and 42 to a supply and exhaust valve S and E, respectively, by means of which water under pressure is admitted to and exhausted from the plunger cylinder. The pipe 40 of the reversing valves and the pipe 44 of the supply valve are connected to a suitable source of water pressure supply, while the corresponding pipes 39 and 45 are led to a receiving tank or to the sewer. An automatic stop valve L is placed between the hydraulic cylinder and the supply and exhaust valves, and its function is to cut off the supply or exhaust at the upper and lower limits of travel of the elevator, regardless of the valves S and E. The stop valve is normally maintained in inoperative or neutral position by means of a weight W' and is automatically moved in one direction or the other by means of a cable G provided with stop balls which are engaged by the car at the limits of travel, any movement of the cable G being transmitted to the stop valve L through the rack and pinion mechanism F. The electrical portion of the system comprises a series of push buttons 10 in the car and corresponding push buttons 11, 12, 13 and 14 located at each floor landing, there being as many portion of the system comprises a series of there are floors, and in this particular instance I have illustrated a four floor installation. The doors at each floor landing is provided with a door contact 15 which is normally closed, while a normally closed safety switch 29 is shown in the car in addition to the car buttons 10. The car and floor push buttons are connected to corresponding relays 16, 17, 18 and 19, each of which is connected to a corresponding contact on the floor controller 20 shown at the top of the hatchway. The floor controller comprises a rotatable contact ring or commutator and a number of stationary contacts co-acting therewith, the commutator being driven from the elevator car through a train of reducing gearing 22, by means of a cable or sprocket chain 21 which is secured to the car at either end and travels therewith. A non-interference and safety car relay are designated by 23 and 27 respectively, the former being a compound or double wound relay and having its winding 24 and 25 connected in opposition. In order to supply the electrical system with a suitable current, I provide a small low-voltage direct current generator 31, which is arranged to be driven by the elevator as the latter travels up and down, and I find a convenient way of doing this is to belt the generator to a pulley 30 operated by the sprocket chain 21. While this arrangement provides a convenient means for driving the generator, it is obvious that the latter could just as well be operatively connected to any part of the elevator which moves in synchronism with the car, such as the counterweight, or if so desired the generator could be belted to one of the guide sheaves A. The generator is preferably shunt wound, since this type of machine is self exciting on open circuit, but if desired it may be series or compound wound, or it may have a permanent field such as a magneto. The generator is electrically connected through an automatic switch 32 to a storage battery 34 which in turn is connected through a hand switch 36 to the system of control.

Assuming the storage battery to be charged, the hand switch 36 in closed position, and the elevator car at rest opposite the second floor landing as shown, the operation is as follows: A passenger at the top floor desiring to use the elevator, presses the button 14. This operation closes a circuit from the positive or + terminal of the storage battery, through the hand switch 36 and door contacts 15 in series, safety switch 29, through the opposing magnet windings 25 and 24 of the non-interference relay 23, normally closed contacts 26 of this relay, through the push button 14, magnet winding of the floor relay 19, contacts 46 and 48, and contact segment 47 of the floor controller, through the contacts of the "up" limit switch 49, through the magnet winding 50 of the "up" reversing valve U, and through the hand switch 36 to the negative or — terminal of the storage battery 34. This circuit just established, effects the operation of the floor relay 19 and the reversing valve U. When the floor relay operates to close its contacts, a self holding circuit is established which circuit is in shunt to the winding 24 of the relay 23 and the push button 14, hence the winding 24 becomes deënergized and permits the winding 25 to separate the contacts 26, thereby open-circuiting all of the floor push buttons and preventing any interference therefrom at this time. By reference to Fig. 2 it will be seen that the energization of the magnet 50 of the reversing switch U causes the magnet plunger 51 to move upwardly against the action of the spring 52, thereby carrying the piston valve 43 into a position in which water under pressure may pass from the pipe 40 to the pipe 41. Turning now to Fig. 1, it is seen that the water pressure in the pipe 41 will act upon the top of the motor piston of the supply valve S, moving the same downwardly and thereby establishing a communication between the main supply pipe 44 and plunger cylinder H, the water passing freely through the stop valve L. The water now causes the plunger P to move upwardly, carrying with it the elevator car C. This upward movement of the car causes the sprocket chain to rotate the floor controller in a left-hand or anti-clockwise direction. As the car approaches the upper floor landing, the contact segment 47 of the floor controller rotates out of engagement with the contact 46, thereby interrupting the self-holding operating circuit, and the reversing valve U, together with the relays 19 and 23, assume their normal position. As soon as the magnet of the reversing valve becomes deënergized, the valve spring 52 (see Fig. 2) moves the piston valve to its lowermost position, thereby cutting off all communication between the pipe 41 and the supply pipe 40 and establishing a passage between the pipe 41 and the exhaust pipe 39. The water pressure from the main supply pipe 44 acting upon the different areas of the motor and main valve pistons of the supply valve S' moves the valve upwardly thereby cutting off the supply to the plunger cylinder and the car comes to rest opposite the top floor landing. The passenger now opens the landing door and entering the car presses one of the buttons 10 corresponding to the floor at which he desires to be carried, he having in the meanwhile closed the landing door behind him. Upon pushing one of the buttons 10 a circuit will be closed from the positive terminal of the storage battery, through the door contacts, safety button 29, winding 25 of the relay 23, through the winding of the safety relay 27, one of the buttons 10, and through one of the floor relays, floor controller 20, down limit switch 53, and magnet winding of the reversing valve D. The latter will at once raise its core and connected valve mechanism, thereby permitting water under pressure from the pipe 40 to operate the main exhaust valve E precisely as the supply valve S was previously operated, and the car will descend, the water in the plunger cylinder being forced out by the unbalanced weight of the car and plunger. When the car reaches the designated floor, the floor controller will automatically interrupt the operating circuit at one of its contacts, and the reversing valve D will close the supply to the main exhaust valve E, and connect the pipe 42 to the exhaust pipe 39, thereby permitting the main exhaust valve to close and stop the elevator car.

It will be observed that the operation from the car buttons is slightly different from that of the floor buttons, in that the operating circuit established from the car buttons includes but one winding of the non-interference relay 23, and the winding of the safety relay 27. The contacts 26 of the relay 23 opens immediately upon pushing a car button, thereby rendering dead all of the floor buttons, and at the same time energizing the relay 27 which closes the contacts 28, thereby establishing a self-holding circuit for the relays 27 and 23 which circuit is not interrupted at the floor controller upon the stopping of the car. This self-holding circuit may be traced from the positive battery terminal, through the door contacts 15, safety switch or button 29, winding 25, winding of relay 27, contacts 28 to the negative battery terminal. From this it is seen that no subsequent operation of the elevator can be effected by means of the floor buttons unless and until the passenger in the car first opens a landing door to interrupt this self-holding circuit and leaving the car closes the door after him. The system is then placed in condition for a subsequent operation from the floor landings.

Both mechanical and electrical means are provided for automatically stopping the car at its upper and lower limits of travel. The mechanical means comprises the automatic stop valve L which, as before pointed out, is moved to a position to stop the car when the latter reaches a position in which it will engage the stop balls connected to the stop cable G. The electrical means comprises the top and bottom limit switches 49 and 53, the operation of which will immediately interrupt the operating circuit to stop the car. The safety switch or button 29 in the car may be manually operated in case of emergency to stop the car at any point in its travel.

Thus far little has been said about the generator 31, but as this generator taken in conjunction with the storage battery 34 forms a principal part of my invention, I will now point out its operation. As before explained, the generator is connected to run with the elevator, being operatively connected thereto. As the elevator is operated, the generator will rotate, its direction of rotation being reversed every time the car changes its direction of travel. In order that the current from the generator may always flow in the same direction and not be reversed every time the elevator is reversed, I provide switch contacts such as 37 and 38 which are operated by the reversing valves and which reverse the relative connection between the armature and field of the generator so that no matter in what direction the elevator car may be traveling the current from the generator will always flow in one and the same direction. The generator supplies current to the storage battery when the elevator is running but is disconnected therefrom when the elevator is at rest. This is necessary, for the reason that were the battery permanently connected to the generator the same would tend to discharge therethrough, which would in all probability ruin both battery and generator. In order to guard against this, I provide an automatically operated switch 32 between the generator and the battery which will operate to disconnect the two when the elevator is at rest or moving at slow speed, but which will connect the generator in circuit so as to charge the storage battery when the car is traveling at normal speed. This automatic switch comprises a magnet 54 which when properly energized closes a pair of contacts 33, thereby closing a circuit from the generator through the changing resistance 35 to the storage battery terminals. A spring 55 opposes the operation of the switch 32 and the tension of this spring may be varied to any desired amount. Since the magnet 54 is connected across, or in parallel to the generator brushes, it will operate when the potential of the generator reaches a predetermined value. The potential of the generator when the latter is operating at normal speed should be slightly in excess of that of the battery and the switch 32 is set to operate at substantially that potential. Thus when the car is traveling at normal speed the switch will operate to connect the generator in circuit with the battery and the latter will be charged, the resistance 35 being for the purpose of regulating the potential of the charging circuit and preventing the battery from receiving a charging current at too high a voltage. As the elevator slows down or comes to rest, the potential of the generator is reduced and the spring 55 is enabled to open the contacts 33, thereby disconnecting the generator from the battery.

In some cases I propose to dispense with the reversing contacts 37 and 38 of Fig. 1 and use instead the modification illustrated in detail in Fig. 3. This latter arrangement comprises a ring 77 arranged to have a limited rotation and upon which are mounted the insulated generator brushes 83. This ring is arranged concentrically with a fixed ring 78 secured to the generator and provided with stops 81—81 which engage a detent 80 secured to the ring 77 and permit a rotation of the latter of substantially 180°. Anti-friction rollers 79 are placed between the respective rings so that the rotation of the generator commutator 82 to the right will carry the brush ring through an angle of 180°, or until the detent 80 engages the lower stop 81, the frictional engagement of the brushes on the commutator being sufficient to effect this movement. In this manner the relative position of the generator brushes is reversed every time the direction of rotation of the generator is reversed so that the current from the latter will always flow in the same direction.

From the foregoing disclosure, it may be seen that my invention provides a simple, practical and convenient means for supplying an unfailing source of electric current most suitable for use in the operating, controlling and safety circuits of an electrically controlled elevator. In this way I am enabled to derive the full benefits from an electric system of control for elevators of all kinds, without having to contend with the disadvantageous and undesirable features found in most systems using electricity for controlling purposes. Furthermore, I can use a controlling system embodying my invention with all types of elevators such as steam, hydraulic, pneumatic and electric, using the steam, water, compressed air, etc., to do the heavy work of driving the elevator, while the operating and controlling system is effected by purely electrical means in a very efficient and reliable manner.

The storage battery may be of low ampere-hour capacity as its duties are very light, while the generator may be small and consequently inexpensive as its chief duty is to keep the storage battery properly charged. A small current will be taken from the battery while starting, but as soon as the elevator substantially attains its normal running speed the generator takes up the load of the battery and supplies the current necessary for the operating circuits. That is to say, at times the battery alone supplies current, at other times the battery and generator act together or jointly to supply current, while at still other times the generator not only supplies all of the current used in the operating circuit, but supplies current for charging the storage battery at one and the same time.

The battery being kept in a constantly charged condition will seldom or never require any attention, while the generator being of small size and having very little work to perform will last as long as the elevator to which it is applied.

I am aware that it has been proposed to utilize primary batteries for supplying energy to the operating circuits of an elevator, but I know further that this arrangement has proven to be very unsatisfactory in many respects and a constant source of trouble and expense, and furthermore to be unreliable. When ordinary primary batteries are used for any considerable length of time they tend quickly to polarize and become unable to perform their duty, and at best they require almost daily attention and are no end of trouble from start to finish. My invention supplies a much needed want and leaves nothing to be desired.

While I have illustrated and described a preferred embodiment of my invention, I desire not to be limited to the precise arrangement and construction of parts herein disclosed, since it is obvious that one skilled in the art could readily suggest changes therein without departing from the spirit and scope of the invention.

What I claim as new and desire to have protected by Letters Patent of the United States is:—

1. In a plunger elevator, the combination of the car, means for controlling the application of power to operate the car, a generator driven by the car for supplying current to effect the operation of the said controlling means, a storage battery, chargeable by the generator, and a switch to connect the battery to the said controlling means.

2. In a hydraulic plunger elevator, the combination with a car, of means for controlling the application of power to operate the car, a storage battery arranged to operate said controlling means, and a generator driven by the car for supplying electrical energy to said storage battery, and a power transmission belt between the generator and the car serving to connect them together when the car is ascending and descending.

3. In a hydraulic plunger elevator, the combination of the car, power operable means to lift the car, a dynamo, a driving connection, directly between the car and dynamo, serving to connect the generator with the car when ascending and descending, a storage battery, electrical conductors between the dynamo and battery, a switch automatically operable to reverse the relative connections between the armature and field of the dynamo, and another switch, automatically operable electrically to connect the dynamo and battery in circuit with each other when the car is running and disconnect them when the car is stopped.

4. In a hydraulic plunger elevator, the combination of the car, up and down reversing valves therefor, push buttons in the car and corresponding push buttons at each landing floor, a floor controller, having a rotatable contact ring and stationary contacts co-actable therewith, a dynamo, a gearing, affixed to the car, and directly connected to the contact ring of the floor controller and the armature of the dynamo, serving to connect the generator with the car when ascending and descending, a storage battery, in circuit with the dynamo, a switch automatically operable to reverse the relative connection between the armature and field of the dynamo, another switch, automatically operable to connect the dynamo and battery in circuit together when the car is running and disconnect them from each other when the car is stopped, and electrical circuits between the valves, push buttons, floor controller, dynamo and battery.

5. In a hydraulic elevator, the combination of the car, a hydraulic motor to lift the car, mechanism to control the hydraulic motor, electro-responsive means to actuate the said mechanism, a storage battery forming a source of electrical energy for the said electro-responsive means, an automatic push-button system of circuits and apparatus comprising a floor controller to control electrical connections, between the electro-responsive means and the storage battery, a dynamo, gearing operatively to connect the floor controller and dynamo with the elevator car for actuation thereby, serving to connect the generator with the car when ascending and descending, switch mechanism actuated by the said electro-responsive means, automatically to reverse the relative connection between the armature and field of the dynamo, a switch included in a circuit between the storage battery and dynamo, and means controlled by the dynamo to actuate the said switch.

In testimony whereof, I have signed my name to this specification in the presence of two subscribing witnesses.

FLOYD C. FURLOW.

Witnesses:
JAMES G. BETHELL,
CHARLES E. BREITWEISER.